United States Patent [19]
Hart

[11] Patent Number: 5,906,888
[45] Date of Patent: *May 25, 1999

[54] PRIMED FILM COMPRISING A POLYMERIC SUBSTRATE WITH COPOLYMER LAYER THEREON

[76] Inventor: Charles Richard Hart, 16 Linden Close, Hutton Rudby, Nr Yarm, Cleveland, United Kingdom

[*] Notice: This patent is subject to a terminal disclaimer.

[21] Appl. No.: 08/456,617

[22] Filed: Jun. 1, 1995

Related U.S. Application Data

[63] Continuation of application No. 07/935,660, Aug. 26, 1992, abandoned, which is a continuation of application No. 07/608,399, Nov. 2, 1990, abandoned.

[30] Foreign Application Priority Data

Nov. 7, 1989 [GB] United Kingdom ............... 8925095

[51] Int. Cl.$^6$ .............................. B32B 27/06; B32B 27/36
[52] U.S. Cl. ..................... 428/323; 428/461; 428/483; 428/520; 428/522; 526/286; 526/287
[58] Field of Search ..................... 428/323, 461, 428/463, 520, 522; 526/286, 287

[56] References Cited

U.S. PATENT DOCUMENTS

| | | | |
|---|---|---|---|
| 4,880,700 | 11/1989 | Charmot et al. | 428/337 |
| 4,908,277 | 3/1990 | Tsunashima et al. | 428/480 |
| 5,035,945 | 7/1991 | Hart | 428/323 |

FOREIGN PATENT DOCUMENTS

| | | |
|---|---|---|
| 0035614 | 9/1981 | European Pat. Off. . |
| 0357196 | 3/1990 | European Pat. Off. . |

*Primary Examiner*—D. S. Nakarani

[57] ABSTRACT

A primed film comprises a polymeric film substrate layer having an adherent layer comprising a copolymer comprising comonomers (a) 35 to 40 mole % alkyl acrylate, (b) 35 to 40 mole % alkyl methacrylate, (c) 10 to 15 mole % of a monomer containing a free carboxyl group, and (d) 15 to 20 mole % of an aromatic sulphonic acid and/or a salt thereof. The primed film can be used, for example, for producing metallised films, drafting films, photographic films and magnetic cards.

10 Claims, 1 Drawing Sheet

PRIMED FILM COMPRISING A POLYMERIC SUBSTRATE WITH COPOLYMER LAYER THEREON

This is a continuation of application Ser. No. 07/935,660, filed on Aug. 26, 1992, which was abandoned upon the filling hereof which is a continuation of Ser. No. 07/608,399, filed Nov. 2, 1990, now abandoned.

This invention relates to a primed polymeric film, and in particular to a product made therefrom.

BACKGROUND OF THE INVENTION

Polymeric films are often used with other materials, for example by coating or laminating polymeric films to form a laminate or composite which exhibits improved properties, compared to the component materials. It is well known in the art that many coating or adhesive compositions do not adhere well to various types of polymeric film. In addition, inks and lacquers do not generally adhere well to polymeric films. The adhesive property of polymeric base films can be improved by applying a primer layer of a coating material which is more receptive to subsequently applied coating layers. Unfortunately, a primer layer will generally only improve the adhesion of a particular type of coating, ink or lacquer, being compatible with a subsequently applied aqueous or organic solvent-based coating medium, but not with both.

The tendency of polymeric films to accumulate detrimental static electrical charges on surfaces thereof is well known. The presence of such charges creates a variety of problems including the attraction of dust and other contaminants to the film surface, the creation of a potential explosion hazard in the presence of organic solvents, difficulties in feeding the films through film handling and treating equipment, blocking, ie the adhesion of the film to itself or to other films, and the risk of fogging subsequently applied light-sensitive coating layers. Antistatic agents can be applied to a polymeric film from a suitable coating or priming composition, but the relatively high concentration at which such agents must be present to provide effective antistatic behavior is usually such as will interfere with the adhesion promoting properties of the primer layer.

SUMMARY OF THE INVENTION

We have now devised an antistatic polymeric film primed with an adherent layer which exhibits improved adhesion between the primed polymeric film and with a wide range of subsequently applied additional layers.

Accordingly, the present invention provides a primed film comprising a polymeric film substrate layer having on at least one surface thereof an adherent layer comprising a copolymer comprising comonomers (a) 35 to 40 mole % alkyl acrylate, (b) 35 to 40 mole % alkyl methacrylate, (c) 10 to 15 mole % of a monomer containing a free carboxyl group, and (d) 15 to 20 mole % of an aromatic sulphonic acid and/or a salt thereof.

The invention also provides a method of producing a primed film by forming a substrate layer of polymeric material, and applying to at least one surface thereof an adherent layer comprising a copolymer comprising comonomers (a) 35 to 40 mole % alkyl acrylate, (b) 35 to 40 mole % alkyl methacrylate, (c) 10 to 15 mole % of a monomer containing a free carboxyl group, and (d) 15 to 20 mole % of an aromatic sulphonic acid and/or a salt thereof.

DESCRIPTION OF PREFERRED EMBODIMENTS

A substrate for use in a primed polymeric film according to the invention may be formed from any suitable film-forming polymeric material. Thermoplastics materials are preferred, and include a homopolymer or copolymer of a 1-olefin, such as ethylene, propylene and but-1-ene, a polyamide, a polycarbonate, and particularly a synthetic linear polyester which may be obtained by condensing one or more dicarboxylic acids or their lower alkyl (up to 6 carbon atoms) diesters, eg terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarborylic acid, such as pivalic acid) with one or more glycols, particularly an aliphatic glycol, eg ethylene glycol, 1,3-propanediol, 1,4-butanediol, neopentyl glycol and 1,4-cyclohexanedimethanol. A polyethylene terephthalate and/or polyethylene naphthalate film is preferred, particularly a polyethylene terephthalate film, especially such a film which has been biaxially oriented by sequential stretching in two mutually perpendicular directions, typically at a temperature in the range 70 to 125° C., and preferably heat set, typically at a temperature in the range 150 to 250° C., for example— as described in British patent GB-A-838708.

The substrate may also comprise a polyarylether or thio analogue thereof, particularly a polyaryletherketone, polyarylethersulphone, polyaryletheretherketone, polyaryletherethersulphones or a copolymer or thioanalogue thereof. Examples of these polymers are disclosed in EP-A-1879, EP-A-184458 and U.S. Pat. No. 4,008,203, particularly suitable materials being those sold by ICI PLC under the Registered Trade Mark STABAR. Blends of these polymers may also be employed.

Suitable thermoset resin substrate materials include addition—polymerisation resins—such as acrylics, vinyls, bis-maleimdes and unsaturated polyesters, formaldehyde condensate resins—such as condensates with urea, melamine or phenols, cyanate resins, functionalised polyesters, polyamides or polyimides.

The polymeric film substrate for production of a primed film according to the invention may be unoriented, or uniaxially oriented, but is preferably biaxially oriented by drawing in two mutually perpendicular directions in the plane of the film to achieve a satisfactory combination of mechanical and physical properties. Simultaneous biazial orientation may be effected by extruding a thermoplastics polymeric tube which is subsequently quenched, reheated and then expanded by internal gas pressure to induce transverse orientation, and withdrawn at a rate which will induce longitudinal orientation. Sequntial stretching may be effected in a stenter process by extruding the thamoplootice substrate material as a flat extrudate which is subsequently stretched first in one direction and then in the other mutually perpendicular direction. Generally, it is preferred to stretch firstly in the longitudinal direction, ie the forward direction through the film stretching machine, and then in the transverse direction. A stretched substrate film may be, and preferably is, dimensionally stabilised by heat-setting under dimensional restraint at a temperature above the glass transition temperature thereof.

The substrate is suitably of a thickness from 12 to 300, particularly from 50 to 175, and especially from 50 to 125 μm.

The alkyl group of monomer (a) is preferably a lower alkyl group, for example an alkyl group containing up to six carbon atoms such as methyl, ethyl, n-propyl, isopropyl, n-butyl, isobutyl, terbutyl, and hexyl. Ethyl acrylate is a particularly preferred monomer (a).

The alkyl group of monomer (b) is preferably a lower alkyl group, for example an alkyl group containing up to six carbon atoms such as methyl, ethyl, n-propyl, isopropyl, n-butyl, isobutyl, terbutyl, and hexyl. Methyl methacrylate is a particularly preferred monomer (b).

Monomer (c) containing a free carboxyl group ie a carboxyl group other than those involved in the polymerisation reaction by which the copolymer is formed, suitably comprises a copolymerisable unsaturated carboxylic acid, and is preferably selected from acrylic acid, maetcrylic acid, maleic acid, and/or itaconic acid; with acrylic acid and itaconic acid being particularly preferred.

The aromatic sulphonic acid monomer (d) may be present in the copolymer of the present invention as the free acid and/or a salt thereof, for example as the ammonium, substituted ammonium, or an alkali metal, such as lithium, sodium or potassium, salt. The sulphonate group does not participate in the polymerisation reaction by which the adherent copolymer resin is formed. The use of non-aromatic sulphonate-containing monomers can result in inadequate antistatic properties of the resultant adherent layer coated film, and also to destabilisation of the copolymer emulsion during polymerisation, rendering the water sensitivity of the copolymer unacceptable. The aromatic sulphonic acid polymer is preferably p-styrene sulphonic acid and/or a salt thereof.

The adherent layer preferably comprises a copolymer comprising comonomers (a) 35 to 37.5 mole % alkyl acrylate, (b) 35 to 37.5 mole % alkyl methacrylate, (c) 10 to 20 mole % of a monomer containing a free carboxyl group, and (d) 15 to 20 mole % of an aromatic sulphonic acid and/or a salt thereof. A particularly preferred copolymer comprises ethyl acrylate/methyl methacrylate/itaconic acid/p-styrene sulphonic acid and/or a salt thereof in a ratio of 35/35/15/15 mole %, and especially in a ratio of 37.5/37.5/10/15 mole %.

The weight average molecular weight of the copolymer may vary over a wide range, but is preferably from 10,000 to 10,000,000, and more preferably of the order of 1,000,000.

If desired, the coating composition may also contain a cross-linking agent which functions to cross-link the polymeric coating layer thereby improving adhesion to the polymeric substrate. Additionally, the cross-linking agent should preferably be capable of internal cross-linking in order to provide protection against solvent penetration. Suitable cross-linking agents may comprise epoxy resins, alkyd resins, amine derivatives such as hexamethoxymethyl melamine, and/or condensation products of an amine, eg melamine, diazine, urea, cyclic propylene urea, thiourea, cyclic ethylene thiourea, an alkyl melamine, such as butyl melamine, an aryl melamine, a guanamine, an alkylguanamine, and aryl guanamine, a benzoguanamine, or glycoluril, may be condensed with an aldehyde, such as formaldehyde. A useful condensation product is that of melamine with formaldehyde. The condensation product is preferably alkonylated, eg ethoxylated. The cross-linking agent is preferably used in amounts of up 25%, and particularly at least 10%, by weight based on the weight of the polymer in the coating composition. Acceleration of the cross-linking may be effected, if desired, by adding a suitable catalyst to the adherent polyester resin. Preferred catalysts for cross-linking melamine formaldehyde include ammonium chloride, ammonium nitrate, ammonium thiocyanate, ammonium dihydrogen phosphate, ammonium sulphate, diammonium hydrogen phosphate, para toluene sulphonic acid, maleic acid stabilised by reaction with a base, and morpholinium paratoluene sulphonate.

The copolymer of the coating composition is generally water-insoluble. The coating composition including the water-insoluble copolymer may nevertheless be applied to the polymeric film substrate as an aqueous dispersion or alternatively as a solution in an organic solvent. Application from an aqueous medium is economically advantageous, avoids the potential explosive and toxicity hazards associated with the use of volatile organic solvents, and eliminates the problem of residual odour frequently encountered when an organic solvent is employed.

To achieve good wetting and levelling properties of the aqueous adherent medium on a polymeric film substrate, it is desirable that the surface energy of the adherent medium is less than that of the film substrate.

Suitable reduction in surface tension can be achieved by the addition of one or more surfactants to the adherent medium, for example alcohol ethoxylates, and ethoxylated alkyl, eg nonyl, phenols.

The adherent coating medium may be applied to an already oriented film substrate—such as a polyimide film. However, application of the coating medium is preferably effected before or during the stretching operation.

In particular, it is preferred that the adherent coating medium should be applied to the film substrate between the two stages (longitudinal and transverse) of a thermoplastics film biaxial stretching operation. Such a sequence of stretching and coating is especially preferred for the production of a coated linear polyester film substrate, such as a coated polyethylene terephthalate film, which is preferably firstly stretched in the longitudinal direction over a series of rotating rollers, coated with the adherent layer, and then stretched transversely in a stenter oven, preferably followed by heat setting.

Prior to deposition of the adherent coating medium onto the polymeric substrate the exposed surface thereof may, if desired, be subjected to a chemical or physical surface-modifying treatment to improve the bond between that surface and the subsequently applied adherent layer. A preferred treatment, because of its simplicity and effectiveness, which is particularly suitable for the treatment of a polyolefin substrates, is to subject the exposed surface of the substrate to a high voltage electrical stress accompanied by corona discharge. Alternatively, the substrate may be pretreated with an agent know in the art to have a solvent or swelling action on the substrate polymer. Examples of such agents, which are particularly suitable for the treatment of a polyester substrate, include a halogenated phenol dissolved in a common organic solvent eg a solution of p-chloro-m-cresol, 2,4-dichlorophenol, 2,4,5- or 2,4,6-trichlorophenol or 4-chlororesorcinol in acetone or methanol.

An adherent Coating may be applied to one or each surface of the polymeric substrate. Alternatively, one surface of the substrate may be uncoated, or may be coated with a layer of a material other than the herein specified adherent medium.

The adherent copolymer may be applied to the polymeric film substrate as an aqueous dispersion or as a solution in an organic solvent by any suitable conventional coating technique such as gravure roll coating, reverse roll coating, dip coating, bead coating, slot coating or electrostatic spray coating. The solution or dispersion is suitably applied in an amount such that the thickness of the adherent layer when dried, for example—by heating the coated substrate, will provide an effective bond to any subsequently applied layer.

Modification of the surface of the adherent layer, eg by flame treatment, ion bombardment, electron beam treatment, ultra-violet light treatment or preferably by corona discharge, may improve the adhesion of subsequently applied coatings, inks and lacquers, but may not be essential to the provision of satisfactory adhesion.

The preferred treatment by corona discharge may be effected in air at atmospheric pressure with conventional equipment using a high frequency, high voltage generator, preferably having a power output of from 1 to 20 kw at a potential of 1 to 100 kv. Discharge is conveniently accomplished by passing the film over a dielectric support roller at the discharge station at a linear speed preferably of 1.0 to 500 m per minute. The discharge electrodes may be positioned 0.1 to 10.0 mm from the moving film surface.

Satisfactory adhesion of a range of coating materials applied directly to the surface of the adherent layer can however be achieved without any prior surface modification, eg by corona discharge treatment. An example of an adherent layer which provides adequate adhesion without corona discharge treatment is is a copolymer of ethyl acrylate/methyl methacrylate/itaconic acid/p-styrene sulphonic acid and/or a salt thereof in a ratio of 35/35/15/15 mole %.

The ratio of substrate to adherent layer thickness may vary within a wide range, although the thickness of the adherent Layer preferably should not be less than 0.004% nor greater than 10% of that of the substrate. In practice, the thickness of the adherent layer is desirably at least 0.01 $\mu$m, preferably should not greatly exceed about 1.0 $\mu$m, and more preferably should not greatly exceed about 0.2 $\mu$m.

One or more of the layers of a polymeric film according to the invention may conveniently contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, ultra-violet light stabilizers, viscosity modifiers and dispersion stabilizers may be incorporated in the substrate, and/or adherent layer(s), and/or additional coated layers as appropriate. In particular an additional coated layer, and/or adherent layer, and/or a substrate, may comprise a particulate filler, such as silica, of small particle size. Desirably, a filler, if employed in a substrate layer, should be present in a small amount, not exceeding 0.5%, preferably less than 0.2%, by weight of the substrate. A film suitable for use as a drafting material can be produced by adding filler particles to the adherent layer. The filler particles roughen the film surface rendering it receptive to marking with drafting instruments, such as pencils. The filler may, for example, be an inorganic or a thermoplastics particulate filler. Suitable inorganic fillers may be chosen from silica, especially precipitated or diatomaceous silica and silica gels, calcined china clay, barium sulphate, calcium carbonate and aluminum trihydrate. Silica particles are particularly preferred. Preferably the filler particles have an average particle size of 0.01 to 5 $\mu$m, more preferably 0.02 to 0.5 $\mu$m, and especially 0.03 to 0.15 $\mu$m. In a preferred embodiment of the invention a mixture of filler particles of different particle sizes is used, especially a mixture of particles having an average particle size of 0.03 to 0.05 $\mu$m and 0.1 to 0.15 $\mu$m, particularly where the concentration by weight of the smaller particles is greater than that of the larger particles. The filler particles preferably comprise from 20 to 200%, more preferably from 50 to 150%, and especially about 100% by weight of the adherent layer relative to the weight of the copolymer. An adherent layer comprising the aforementioned filler particles is particularly suitable for coating onto an opaque voided substrate, especially a polyester film comprising barium sulphate filler which can be used as a photographic printing material, as disclosed in GB-A-1563591. Thus a preferred embodiment of the invention is suitable for use as a photographic film and comprises an opaque voided substrate having on a first surface thereof a photographic emulsion layer, and an adherent layer comprising the aforementioned filler particles on a second surface of the substrate. The adherent layer confers both antistatic property and receptivity to writing materials on the film.

Primed polymeric films of the present invention can be used to form various types of composite structures by coating or laminating additional materials onto the primed substrate film. For example the adherent layer coated polymeric films exhibit good adhesion when laminated with metal foils such as copper, aluminum and nickel, which can be used to form circuit boards. Vacuum bag lamination, press lamination, roll lamination or other standard lamination techniques can be utilised to form the aforementioned laminates.

Deposition of a metallic layer onto the, or each, adherent layer may be effected by conventional metalizing techniques—for examples by deposition from a suspension of finely-divided metallic particles in a suitable liquid vehicle, or, preferably, by a vacuum deposition process in which a metal is evaporated onto the adherent resin surface in a chamber maintained under conditions of high vacuum. Suitable metals include palladium, nickel, copper (and alloys thereof, such as bronze), silver, gold, cobalt and zinc, but aluminum is to be preferred for reasons both of economy and ease of bonding to the resin layer.

Metalizing may be effected over the entire exposed surface of the adherent layer or over only selected portions thereof, as desired.

Metallized films may be prepared in a range of thicknesses governed primarily by the ultimate application for which a particular film is to be employed.

A lacquer layer may be applied over the adherent layer to produce a film suitable for use as a drafting film. The lacquer layer preferably comprises one or more polyvinyl alcohol and/or polyvinyl acetal resins. Polyvinyl acetal resins can be suitably prepared by reacting polyvinyl alcohols with aldehydes. Commercially available polyvinyl alcohols are generally prepared by hydrolysing polyvinyl acetate. Polyvinyl alcohols are usually classified as partially hydrolyzed (comprising 15 to 30% polyvinyl acetate groups) and completely hydrolyzed (comprising 0 to 5% polyvinyl acetate groups). Both types of polyvinyl alcohols, in a range of molecular weights, are used in producing commercially available polyvinyl acetal resins. The conditions of the acetal reaction and the concentration of the particular aldehyde and polyvinyl alcohol used will determine the proportions of hydroxyl groups, acetate groups and acetal groups present in the polyvinyl acetal resin. The hydroxyl, acetate and acetal groups are generally randomly distributed in the molecule. Suitable polyvinyl acetal resins include polyvinyl butyral, and preferably polyvinyl formal.

The lacquer layer preferably additionally comprises finely divided particulate material. When the polymeric film is to be used as a drafting material, the particulate material employed should impart a surface roughness to the film surface which can be marked and will retain the impressions of writing implements such as pencils, crayons and ink.

The finely divided particulate material may be selected from silica, silicates, ground glass, chalk, talc, diamotaceous earth, magnesium carbonate, zinc oxides zirconia, calcium carbonate and titanium dioxide. Finely divided silica is the preferred material for the production of drafting materials, together with which smaller quantities of the other materials may be incorporated, to obtain the required degree of translucency and to increase the toughness and mark resistance of the coating. Desirably, a filler, if employed in a lacquer layer, should be present in an amount of not exceeding 50% by weight of polymeric material, and the average particle size thereof should not exceed 15 μm, preferably less than 10 μm, and especially from 0.1 to 5 μm.

The primed polymeric films can be coated with a range of other organic and/or aqueous solvent based inks and lacquers, for example acrylic coatings, cellulose acetate butyrate lacquer, and diazonium coatings for drawing office applications.

The primed films can also be coated with photographic emulsions, such as light-sensitive gelatinous silver halide emulsions, especially conventional X-ray emulsions. The light-sensitive emulsion may optionally include any of the conventional additives normally used therein The primed films can also be used to form magnetic cards, such as credit cards, and in particular a "pre-paid card", eg a telephone card, and an "intelligent card" capable, for example, of storing information relating to a number of financial transactions. A magnetic card preferably comprises, in orders (i) a magnetic layer, (ii) an adherent layer comprising a copolymer comprising comonomers (a) 35 to 40 mole % alkyl acrylate, (b) 35 to 40 mole % alkyl methacrylate, (c) 10 to 15 mole % of a monomer containing a free carboxyl group, and (d) 15 to 20 mole % of an aromatic sulphonic acid and/or a salt thereof, (iii) a polymeric substrate layer, (iv) an adherent layer as defined in (ii) above, and (v) a graphics layer.

A range of conventional binders may be used for the magnetic coating materials, which are well known to the man skilled in the art. A wide range of inks and lacquers may be used in the graphics layer, such as aqueous and organic solvent-based materials, particularly electron beam—and other UV-curable inks.

BRIEF DESCRIPTION OF THE DRAWINGS

The invention is illustrated by reference to the accompanying drawings in which:

Referring to FIG. 1 of the drawings, the film comprises a polymeric substrate layer (1) having an adherent layer (2) bonded to one surface (3) thereof.

Figure 1:
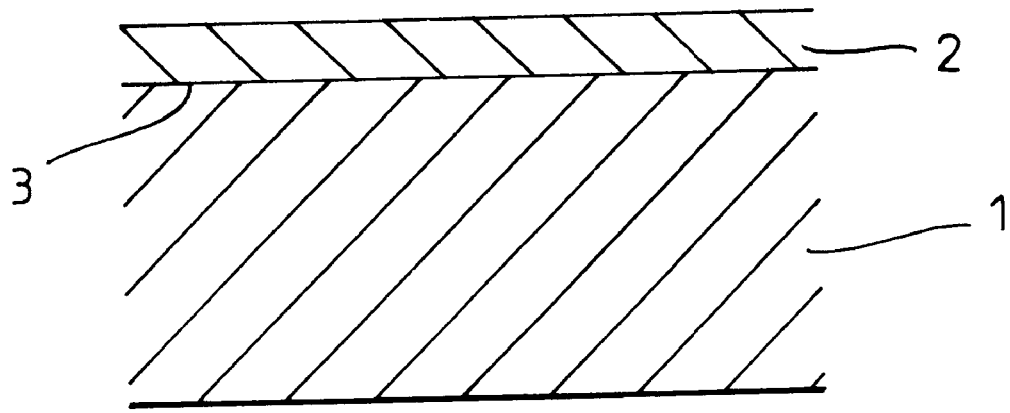
FIG. 1 is a schematic sectional elevation, not to scale, of a polymeric film having an adherent layer.
Figure 2:
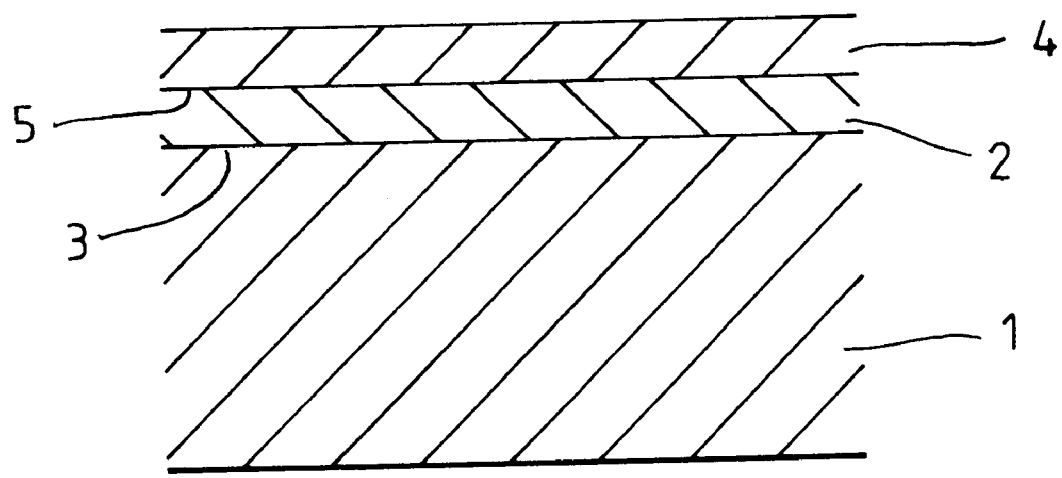
FIG. 2 is a similar schematic elevation of a polymeric film with an additional coated layer bonded to the adherent layer.

The film of FIG. 2 further comprises an additional layer (4) bonded to the remote surface (5) of the adherent layer.

The invention is further illustrated by reference to the following examples. The tests used in the examples were as follows:

CAB lacquer adhesion: The adhesion of an organic solvent based lacquer to the polymeric film was measured using a standard cross-hatch adhesion test. The lacquer was coated using a Meyer bar, and cured in an oven at 120° C. for one minute prior to testing. Cellulose acetate butyrate (CAB) lacquer containing the following ingredients by weight was used:

| Eastman Kodak 3 Seconds 272/3 resin (CAB) | 15.0 parts |
| --- | --- |
| Methyl isobutyl ketone (MIBK) | 42.5 parts |
| Methyl ethyl ketone (MEK) | 42.5 parts |
| Rhodamine dye | 0.06 parts |

The results were determined as the number of squares remaining (a maximum of 100) after one pull of adhesive tape. If 98 or more squares out of a 100 remain after the adhesive tape has been pulled off the polymeric film, the adhesion is acceptable and the film is designated a "pass". If less than 98 squares remain, the adhesion is unacceptable and the film is designated a "fail".

Gelatin adhesion: A polymeric film was coated with a conventional light-sensitive aqueous emulsion which was chilled to gel the coating and dried for 20 minutes at 33° C. The adhesion of the emulsion to the polymeric film in the final photographic film was assessed before processing in standard photographic chemicals, by performing a standard cross-hatch adhesion test. The results were determined as the number of squares remaining (a maximum of 100) after four pulls of adhesive tape. If 95 or more squares out of a 100 remain after the adhesive tape has been pulled off the polymeric film, the adhesion is acceptable and the film is designated a "pass". If less than 95 squares remain, the adhesion is unacceptable and the film is designated a "fail".

Surface resistivity: The antistatic properties of the polymeric film were determined by measuring the surface resistivity (SR) at 70% relative humidity. A SR of less than 10.5, preferably less than 10,0 log ohm/square gives acceptable antistatic properties.

EXAMPLE 1

An aqueous dispersion of ethyl acrylate/methyl methacrylate/itaconic acid/sodium p-styrene sulphonate copolymer of respective proportions 35/35/15/15 mole % was prepared by conventional emulsion polymerization of the following ingredients:

| Ethyl acrylate | 63 ml |
| --- | --- |
| Methyl methacrylate | 62 ml |
| Itaconic acid | 32 g |
| Sodium p-styrene sulphonate | 51 g in 250 ml dist. water |
| Sodium dodecyl benzene sulphonate (Nansa 1260) | 8 ml in 100 ml dist. water |
| Ammonium persulphate | 2 g in 20 ml dist. water |
| Distilled water | 505 ml |

A polyethylene teretphalate film was melt extruded, cast onto a cooled rotating drum and stretched in the direction of extrusion to approximately 3 times its original dimensions. The cooled stretched film was then coated on both sides with an aqueous composition containing the following ingredients:

| Copolymer of ethyl acrylate (EA)/methyl methacrylate (MMA)/itaconic acid (IA)/p-styrene sulphonic acid (SSA) of 35/35/15/15 mole % | 3% w/v |
| --- | --- |
| Synperonic NP 10 (a nonyl phenol ethoxylated surfactant - supplied by ICI) | 0.03% w/v |
| Cymel 300 (a 10% by weight aqueous mixture of melamine formaldehyde resin) | 0.3% w/v |
| Ammonium p-toluene sulphonic acid (a 10% by weight aqueous solution) | 0.03% w/v |

The polyethylene terephthalate film was coated on both sides to give a wet coating thickness on each side of approximately 7 μm.

The adherent layer coated film was passed into a stenter oven, where the film was dried and stretched in the sideways direction to approximately 3 times its original dimensions. The biaxially stretched coated film was heat set at a temperature of about 220° C. by conventional means. Final film thickness was 100 μm and the dry cost weight of each adherent layer was approximately 0.7 mgdm$^{-2}$.

The CAB lacquer adhesion, gelatin adhesion and surface resistivity of the adherent layer coated film were measured. The results are given in Table 1.

EXAMPLE 2

The procedure of Example 1 was repeated except that the copolymer contained acrylic acid (AA) instead of itaconic acid, and the composition of the copolymer was EA/MMA/AA/SSA in a ratio of 37.5/37.5/10/15 mole %. The results are given in Table 1.

EXAMPLE 3

This is a comparative Example not according to the invention. The procedure in Example 1 was repeated except that the polyethylene terephthalate film was not coated with an adherent layer. The results are given in Table 1.

EXAMPLES 4 to 8

These are comparative Examples not according to the invention. The procedure in Example 1 was repeated except that the composition of the copolymers was as follows:

Example 4—EA/MMA/IA in a ratio of 47.5/47.5/5 mole %

Example 5—EA/MMA/IA/SSA in a ratio of 45/45/5/5 mole %

Example 6—EA/MMA/IA/SSA in a ratio of 37.5/37.5/5/20/5 mole %

Example 7—EA/MMA/IA/SSA in a ratio of 37.5/37.5/20/5 mole %

Example 8—EA/MAA/IA/SSA in a ratio of 30/30/20/20 mole %

The results are given in Table 1.

EXAMPLE 9

The procedure in Example 1 was repeated except that the composition of the copolymers was EA/MMA/IA/SSA in a ratio of 37.5/37.5/10/15 mole %. The results are given in Table 1.

EXAMPLE 10

The procedure in Example 1 was repeated except that polyethylene naphthalate film was used instead of polyethylene terephthalate film. The results are given in Table 1.

EXAMPLE 11

This is a comparative Example not according to the invention. The procedure in Example 10 was repeated except that the polyethylene naphthalate film was not coated with an adherent layer. The results are given in Table 1.

EXAMPLE 12

The procedure in Example 1 was repeated except that the polyethylene terephthalate film was inter-draw coated with an aqueous composition containing the following ingredients:

| | |
|---|---|
| Copolymer of ethyl acrylate (EA)/methyl methacrylate (MMA)/itaconic acid (IA)/p-styrene sulphonic acid (SSA) of 35/35/15/15 mole % | 5% w/v |
| Cymel 350 (a 10% by weight aqueous mixture of melamine formaldehyde resin) | 3% w/v |
| K 330 (silica of average particle size 0.04 μm - supplied by Degussa) | 5% w/v |
| Ammonium p-toluene sulphonic acid (a 10% by weight aqueous solution) | 1% w/v |

The surface resistivity of the adherent layer coated film was 8.85 log ohm/square. The coated film was assessed by writing on the film surface with sharpened pencils with hardness between H and 2B and comparing with uncoated polyethylene terephthalate film. The pencil take property of the coated film was good, whilst uncoated polyethylene terephthalate exhibited poor pencil take.

EXAMPLE 13

The procedure in Example 12 was repeated except that the coating composition additionally comprised 0.125% w/v of Syton W (silica of average particle size 0.125 μm, supplied by Monsanto). The pencil take properties of the coated film were very good.

The above examples illustrate the improved properties of adherent layer coated films of the present invention.

TABLE 1

| EXAMPLE No | COPOLYMER COMPOSITION MONOMERS | MOLE % RATIO | CAB LACQUER ADHESION | GELATIN ADHESION | SR (log ohm/square) |
|---|---|---|---|---|---|
| 1 | EA/MMA/IA/SSA | 35/35/15/15 | PASS | PASS | 9.9 |
| 2 | EA/MMA/AA/SSA | 37.5/37.5/10/15 | PASS | PASS | 9.6 |
| 3 (Comp.) | NONE | | FAIL | FAIL | >19 |
| 4 (Comp.) | EA/MMA/IA | 47.5/47.5/5 | FAIL | FAIL | 15.0 |
| 5 (Comp.) | EA/MMA/IA/SSA | 45/45/5/5 | PASS | PASS | 16.5 |
| 6 (Comp.) | EA/MMA/IA/SSA | 37.5/37.5/5/20 | FAIL | FAIL | 11.0 |
| 7 (Comp.) | EA/MMA/IA/SSA | 37.5/37.5/20/5 | PASS | PASS | 12.4 |
| 8 (Comp.) | EA/MMA/IA/SSA | 30/30/20/20 | FAIL | PASS | 10.6 |
| 9 | EA/MMA/IA/SSA | 37.5/37.5/10/15 | PASS | PASS | 9.8 |
| 10* | EA/MMA/IA/SSA | 35/35/15/15 | PASS | PASS | 10.4 |
| 11* (Comp.) | NONE | | FAIL | FAIL | 14.0 |

*Polyethylene naphthalate substrate

I claim:
1. A primed film comprising a polymeric film substrate layer having on at least one surface thereof an adherent layer comprising a copolymer comprising comonomers (a) 35 to 37.5 mole % alkyl acrylate, (b) 35 to 37.5 mole 5 alkyl methacrylate, (c) 10 to 15 mole % of a monomer containing a free carboxyl group, and (d) 15 to 20 mole % of an aromatic sulphonic acid and/or salt thereof, said adherent layer having a surface resistivity of less than 10.5 log ohm/square at 70% relative humidity and improved CAB lacquer or gelatin adhesion compared to the unprimed substrate.

2. A primed film according to claim 1 wherein comonomer (a) is ethyl acrylate, (b) is methyl methacrylate, (c) is itaconic acid and/or acrylic acid, and (d) is p-styrene sulphonic acid and/or a salt thereof.

3. A primed film according to either of claims 1 or 2 wherein the adherent layer is at least partially cross-linked.

4. A primed film according to claim 3 wherein the adherent layer comprises at least 10% by weight of a cross-linking agent.

5. A primed film according to claim 1 wherein the adherent layer comprises a particulate filler having a particle size of less than 5 μm and being present in an amount of up to 200% by weight of the copolymer.

6. A magnetic card which comprises a magnetic layer applied directly or indirectly over a first adherent layer of the primed film according to claim 1, and a graphics layer applied directly or indirectly over a second adherent layer of said primed film, said second adherent layer being applied to the surface of the polymeric film substrate opposite the magnetic layer.

7. A photographic file which comprises a light-sensitive photographic emulsion applied directly or indirectly over the remote surface of the polymeric film substrate of the primed film of claim 1.

8. A metallized film which comprises a metallic layer applied directly or indirectly over the adherent layer of the primed film of claim 1.

9. A drafting film which comprises a lacquer layer applied from an aqueous and/or organic solvent, directly or indirectly over the adherent layer of the primed film of claim 1.

10. A primed film according to claim 1 wherein the copolymer comprises ethyl acrylate, methyl methacrylate, itaconic acid and p-styrene sulphonic acid in the ratio of 37.5/37.5/10/15 mol %.

* * * * *